United States Patent
Kuroishi et al.

(10) Patent No.: US 10,934,992 B2
(45) Date of Patent: Mar. 2, 2021

(54) HYDRAULIC GENERATOR, SPOUTING APPARATUS, AND METHOD FOR MANUFACTURING HYDRAULIC GENERATOR

(71) Applicant: TOTO LTD., Kitakyushu (JP)

(72) Inventors: Masahiro Kuroishi, Kitakyushu (JP); Nobuhiro Hayashi, Kitakyushu (JP); Naoyuki Onodera, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 16/782,528

(22) Filed: Feb. 5, 2020

(65) Prior Publication Data
US 2020/0263654 A1 Aug. 20, 2020

(30) Foreign Application Priority Data
Feb. 18, 2019 (JP) .............................. JP2019-026748

(51) Int. Cl.
| F03B 13/08 | (2006.01) |
| H02K 7/18 | (2006.01) |
| H02K 5/24 | (2006.01) |
| E03C 1/04 | (2006.01) |

(52) U.S. Cl.
CPC ............ *F03B 13/08* (2013.01); *E03C 1/0404* (2013.01); *H02K 5/24* (2013.01); *H02K 7/1823* (2013.01)

(58) Field of Classification Search
CPC ......... F03B 13/08; E03C 1/0404; H02K 5/24; H02K 7/1823
USPC ......... 290/1 R, 43, 52, 54; 137/801; 415/63, 415/200–209
See application file for complete search history.

(56) References Cited

U.S. PATENT DOCUMENTS

| 1,516,095 A | * | 11/1924 | Haeberlein | ............. | F03B 15/10 415/18 |
| 1,530,569 A | * | 3/1925 | Moody | .................... | F03B 3/103 290/52 |
| 1,937,772 A | * | 12/1933 | McCormack | ........... | F03B 15/10 415/21 |
| 2,070,601 A | * | 2/1937 | Jessop | ..................... | F03B 3/145 416/168 R |
| 2,073,044 A | * | 3/1937 | Andrews | ................... | F03B 3/06 416/168 R |
| 4,218,182 A | * | 8/1980 | Tsunoda | ..................... | F03B 3/16 415/205 |
| 4,246,753 A | * | 1/1981 | Redmond | ............... | F03B 13/00 60/398 |
| 4,467,217 A | * | 8/1984 | Roussey | .................. | F03B 3/00 290/54 |
| 4,604,735 A | * | 8/1986 | Parsons | ................... | E03C 1/057 340/552 |

(Continued)

FOREIGN PATENT DOCUMENTS

JP 4556569 B2 10/2010

*Primary Examiner* — Pedro J Cuevas
(74) *Attorney, Agent, or Firm* — Studebaker & Brackett PC

(57) ABSTRACT

The hydraulic generator includes a first structure; a second structure, such that a water passageway from the inflow port to the outflow port is formed by the first structure and the second structure in a state that the second structure is attached to the first structure; a water turbine; and an electrical generator. The second structure is removable from the first structure, and includes a fixing portion fixing the fixed shaft.

6 Claims, 6 Drawing Sheets

(56) References Cited

U.S. PATENT DOCUMENTS

| | | | | |
|---|---|---|---|---|
| 4,731,545 A * | 3/1988 | Lerner | H02K 7/1823 | 290/43 |
| 4,884,326 A * | 12/1989 | Porter | B23P 6/002 | 29/889.1 |
| 4,920,465 A * | 4/1990 | Sargent | F21S 9/046 | 239/18 |
| 4,936,508 A * | 6/1990 | Ingalz | G01F 1/115 | 239/72 |
| 4,963,780 A * | 10/1990 | Hochstrasser | H02K 7/1823 | 310/104 |
| 5,013,214 A * | 5/1991 | Kapich | F01D 15/08 | 415/202 |
| 5,043,592 A * | 8/1991 | Hochstrasser | H02K 7/1823 | 290/52 |
| 5,125,797 A * | 6/1992 | Kapich | A62C 3/0207 | 415/202 |
| 5,134,774 A * | 8/1992 | Porter | B23P 6/002 | 156/305 |
| 5,140,254 A * | 8/1992 | Katzman | A47K 3/281 | 290/54 |
| 5,148,635 A * | 9/1992 | Porter | B23P 6/002 | 451/296 |
| 5,236,305 A * | 8/1993 | Kapich | F02B 39/14 | 415/202 |
| 5,263,814 A * | 11/1993 | Jang | F01D 1/24 | 415/63 |
| 5,626,461 A * | 5/1997 | Rose | A47L 5/22 | 415/206 |
| 6,309,179 B1 * | 10/2001 | Holden | F03B 3/00 | 415/202 |
| 6,509,652 B2 * | 1/2003 | Yumita | F03B 13/00 | 290/54 |
| 6,559,553 B2 * | 5/2003 | Yumita | H02K 7/1823 | 290/54 |
| 6,765,308 B1 * | 7/2004 | Kazanjian | F03B 13/00 | 290/43 |
| 6,768,218 B2 * | 7/2004 | Yumita | F03B 13/00 | 290/54 |
| 6,798,080 B1 * | 9/2004 | Baarman | F03B 13/00 | 290/43 |
| 6,876,100 B2 * | 4/2005 | Yumita | F03B 13/00 | 290/43 |
| 6,885,114 B2 * | 4/2005 | Baarman | E03C 1/08 | 290/43 |
| 6,927,501 B2 * | 8/2005 | Baarman | C02F 9/005 | 290/43 |
| 7,005,758 B2 * | 2/2006 | Yumita | F03B 13/00 | 290/43 |
| 7,067,936 B2 * | 6/2006 | Baarman | F03B 13/00 | 290/43 |
| 7,119,451 B2 * | 10/2006 | Baarman | F03B 13/00 | 290/43 |
| 7,233,078 B2 * | 6/2007 | Baarman | F03B 1/00 | 290/43 |
| 7,253,536 B2 * | 8/2007 | Fujimoto | E03D 3/00 | 290/43 |
| 7,382,061 B2 * | 6/2008 | Ferraro | F04D 25/06 | 290/52 |
| 7,462,945 B2 * | 12/2008 | Baarman | C02F 1/008 | 290/43 |
| 7,608,936 B2 * | 10/2009 | Shimizu | H02K 21/24 | 290/43 |
| 7,663,257 B2 * | 2/2010 | Baarman | F03B 13/00 | 290/43 |
| 7,663,258 B2 * | 2/2010 | Baarman | C02F 9/005 | 290/43 |
| 7,663,259 B2 * | 2/2010 | Baarman | C02F 1/008 | 290/43 |
| 7,675,188 B2 * | 3/2010 | Baarman | F03B 1/00 | 290/54 |
| 7,701,076 B2 * | 4/2010 | Baarman | C02F 1/008 | 290/54 |
| 7,768,147 B2 * | 8/2010 | Baarman | F03B 3/04 | 290/54 |
| 7,812,470 B2 * | 10/2010 | Baarman | C02F 9/005 | 290/43 |
| 7,825,531 B2 * | 11/2010 | Tanaka | H02K 5/1677 | 290/54 |
| 7,871,057 B2 * | 1/2011 | Shimizu | E03C 1/0404 | 251/129.04 |
| 7,919,877 B2 * | 4/2011 | Shimizu | E03C 1/0404 | 290/43 |
| 7,932,618 B2 * | 4/2011 | Baarman | C02F 1/008 | 290/43 |
| 7,956,480 B2 * | 6/2011 | Onodera | H02K 21/12 | 290/54 |
| 7,956,481 B2 * | 6/2011 | Baarman | F03B 3/04 | 290/54 |
| 8,188,609 B2 * | 5/2012 | Baarman | C02F 1/008 | 290/43 |
| 8,426,992 B2 * | 4/2013 | Baarman | C02F 1/008 | 290/43 |
| 8,461,705 B2 * | 6/2013 | Kuroishi | F03B 13/00 | 290/43 |
| 8,698,333 B2 * | 4/2014 | Glasser | H02P 9/04 | 290/43 |
| 8,878,383 B2 * | 11/2014 | Kuroishi | F16K 31/046 | 290/54 |
| 9,695,579 B2 * | 7/2017 | Herbert | E03C 1/057 | |
| 10,151,089 B2 * | 12/2018 | Saruwatari | E03D 5/01 | |
| 10,443,561 B1 * | 10/2019 | Yang | F03B 3/128 | |
| 10,876,512 B2 * | 12/2020 | Freda et al. | F03B 13/08 13/86 | |
| 2002/0041100 A1 * | 4/2002 | Yumita | F03B 3/00 | 290/52 |
| 2002/0047374 A1 * | 4/2002 | Yumita | H02K 7/1823 | 310/81 |
| 2002/0113442 A1 * | 8/2002 | Yumita | F03B 13/00 | 290/54 |
| 2003/0127861 A1 * | 7/2003 | Yumita | H02K 7/1823 | 290/43 |
| 2003/0147238 A1 * | 8/2003 | Allen | F03B 13/00 | 362/192 |
| 2003/0164612 A1 * | 9/2003 | Yumita | F03B 13/00 | 290/1 R |
| 2004/0195840 A1 * | 10/2004 | Baarman | H02K 7/1823 | 290/43 |
| 2005/0006903 A1 * | 1/2005 | Yumita | F03B 13/00 | 290/43 |
| 2005/0077732 A1 * | 4/2005 | Baarman | H02K 7/1823 | 290/54 |
| 2005/0189769 A1 * | 9/2005 | Baarman | E03C 1/08 | 290/43 |
| 2005/0189770 A1 * | 9/2005 | Baarman | F03B 13/00 | 290/43 |
| 2005/0260088 A1 * | 11/2005 | Kalavsky | F04D 29/043 | 417/423.12 |
| 2006/0198728 A1 * | 9/2006 | Fujimoto | F03B 13/00 | 415/203 |
| 2007/0037470 A1 * | 2/2007 | Rothan | B05B 17/08 | 446/176 |
| 2007/0246941 A1 * | 10/2007 | Tanaka | H02K 5/1677 | 290/1 R |
| 2008/0087856 A1 * | 4/2008 | Wilson | E03D 5/105 | 251/129.03 |
| 2008/0217923 A1 * | 9/2008 | Yen | F03B 13/00 | 290/54 |
| 2008/0219831 A1 * | 9/2008 | Yen | F03B 13/00 | 415/1 |
| 2008/0231056 A1 * | 9/2008 | Wen | F03B 13/00 | 290/54 |
| 2008/0246282 A1 * | 10/2008 | Hathaway | F03B 13/00 | 290/54 |
| 2009/0026768 A1 * | 1/2009 | Shimizu | F03B 13/00 | 290/54 |
| 2009/0026769 A1 * | 1/2009 | Shimizu | H02K 7/1823 | 290/54 |

(56) References Cited

U.S. PATENT DOCUMENTS

| | | | | |
|---|---|---|---|---|
| 2009/0146431 | A1* | 6/2009 | Onodera | F03B 13/00 290/54 |
| 2009/0188995 | A1* | 7/2009 | Onodera | E03C 1/057 239/383 |
| 2009/0272445 | A1* | 11/2009 | Shimizu | E03C 1/0404 137/801 |
| 2011/0074157 | A1* | 3/2011 | Kuroishi | F03B 3/00 290/52 |
| 2012/0086204 | A1* | 4/2012 | Re | F03B 13/00 290/43 |
| 2012/0235408 | A1* | 9/2012 | Baarman | C02F 1/325 290/43 |
| 2013/0167953 | A1* | 7/2013 | Kuroishi | E03C 1/055 137/560 |
| 2014/0116553 | A1* | 5/2014 | Schoolcraft | E03C 1/057 137/801 |
| 2014/0246099 | A1* | 9/2014 | Herbert | F03B 13/00 137/78.1 |
| 2018/0062481 | A1* | 3/2018 | Alexander | H04N 9/3141 |
| 2019/0118194 | A1* | 4/2019 | Liu | B05B 1/18 |
| 2019/0368495 | A1* | 12/2019 | Matsui | F04D 29/44 |
| 2020/0011285 | A1* | 1/2020 | Wurm | F03B 3/04 |
| 2020/0313585 | A1* | 10/2020 | Abe et al. | H02P 9/00 9/6 |
| 2020/0378354 | A1* | 12/2020 | Hector, Jr. et al. | F03B 13/08 13/8 |

* cited by examiner

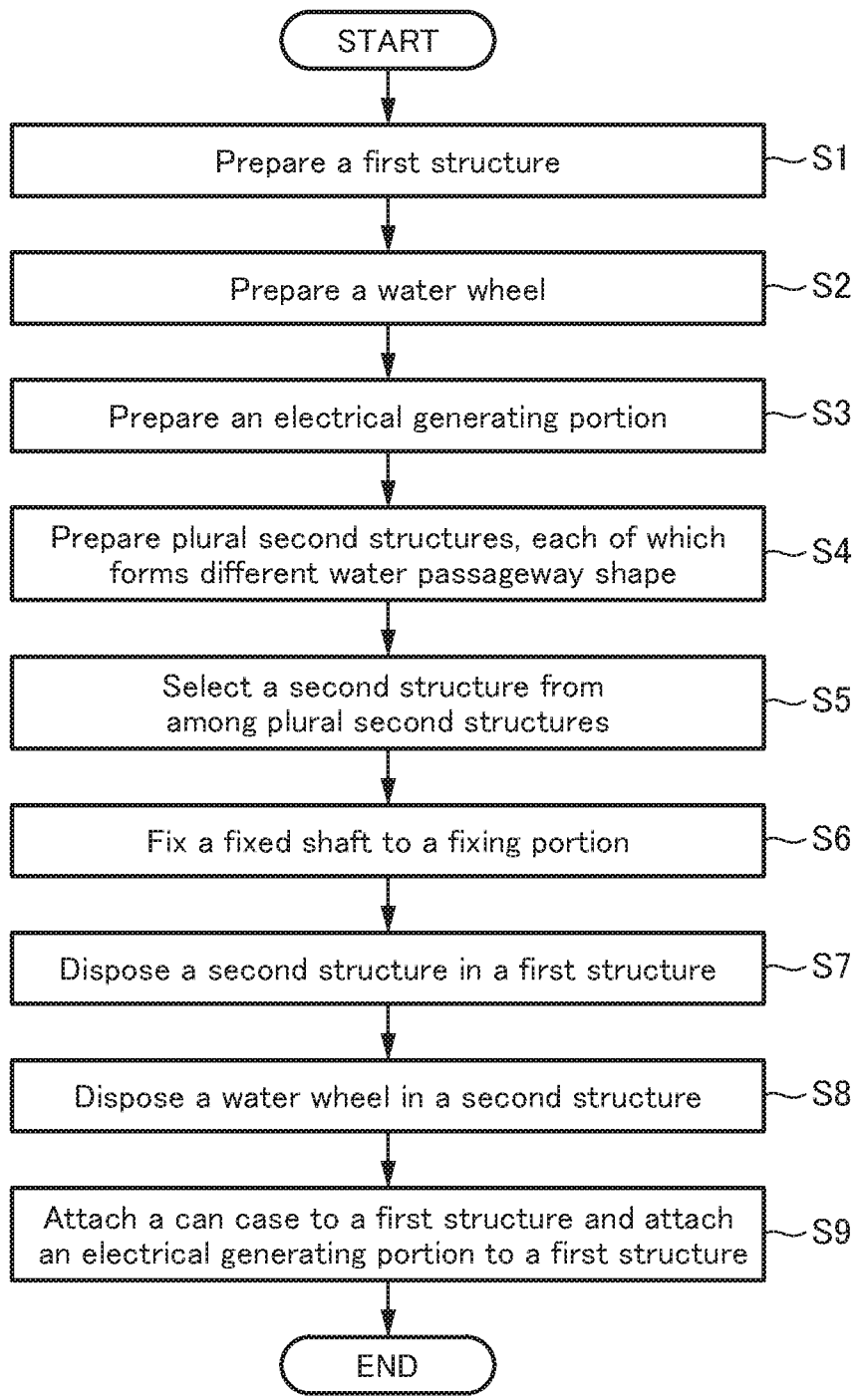

HYDRAULIC GENERATOR, SPOUTING APPARATUS, AND METHOD FOR MANUFACTURING HYDRAULIC GENERATOR

CROSS-REFERENCE TO RELATED APPLICATION

This application claims benefit of priority to Japanese Patent Application No. 2019-026748, filed Feb. 18, 2019, the entire content of which is incorporated herein by reference.

BACKGROUND

Technical Field

The present disclosure relates to a hydraulic generator, a spouting apparatus, and a method for manufacturing a hydraulic generator.

Background Art

As shown in JP4556569, a conventionally known generator comprises a water turbine which rotates by the action of water flow in a flow path, and an attachment which forms at least a part of the flow path from an inflow port to the water turbine, and which can be attached to and removed from the flow path. In the hydraulic generator, because the attachment is attachable to and removable from the flow path, when the flow path is formed by a first structure, the removable attachment forms a second structure which is separate from the first structure. In the hydraulic generator, the cross sectional area of the flow path can be adjusted by changing the attachment, so that the water flow acting on the water turbine can be adjusted. Thereby, water flow having an optimal flow rate can be flowed to the generator even if the supplied flow rate changes.

SUMMARY

However, positional may changes between the attachment attached to the flow path and the water turbine in a generator such as that JP4556569. For example, positional may changes between the attachment and the water turbine would occur when the attachment is attached to the flow path. For example, the position of an attachment would shift due to water pressure on the attachment, and positional changes between the attachment and the water turbine would occur. In such cases there is a concern that the flow rate of the water flow acting on the water turbine would change from the intended flow rate, and that the amount of electricity generated by the generator would be changed from the predetermined amount of electricity generated.

Thus, the present disclosure provides a hydraulic generator wherein it is suppressed that the flow rate of a water flow acting on a water turbine changes from a predetermined flow rate, and changes in the amount of electricity generated can be suppressed, even if the second structure is removably attached in a space within the first structure.

An embodiment of the disclosure provides a hydraulic generator for generating electricity by water power, comprising a first structure configured to form a space communicating between an inflow port and an outflow port; a second structure attached in the space within the first structure, wherein a water passageway from the inflow port to the outflow port is formed by the first structure and the second structure in a state that the second structure is attached to the first structure; a water turbine configured to rotate around a fixed shaft by water flow flowing in the water passageway; and an electrical generator configured to convert water power to electrical power. The second structure is removable from the first structure, and comprises a fixing portion fixing the fixed shaft of the water turbine.

According to an embodiment of the disclosure thus constituted, a second structure which is formed to be attachable to and removable from the first structure, and which comprises a fixing portion fixing a fixed shaft of the water turbine. Thereby even if the second structure is removably attached in a space within the first structure, positional changes of the second structure relative to the water turbine can be suppressed, and positional changes between the second structure forming the water passageway and the water turbine can be suppressed. Therefore, it can be suppressed that a flow rate of water flow acting on the water turbine changes from a predetermined flow rate, and it can be suppressed that an amount of electricity generated is changed from the predetermined amount of the electricity generated.

In an embodiment of the present disclosure, preferably a method for manufacturing a hydraulic generator comprising a first structure configured to form a space communicating between an inflow port and an outflow port; a second structure, being a second structure attached to the space inside the first structure, wherein a water passageway from the inflow port to the outflow port is formed by the first structure and the second structure in a state that the second structure is attached to the first structure; a water turbine configured to rotate around a fixed shaft by water flow flowing in the water passageway; and an electrical generator configured to convert water power to electrical power; the method including the steps of selecting the second structure from among plural second structures, is removable from the first structure and comprises a fixing portion fixing the fixed shaft of the water turbine, and each of which forms different water passageway shape; and fixing the fixed shaft of the water turbine to the fixing portion of the second structure selected in the selecting step.

According to an embodiment of the disclosure thus constituted, by the selecting step, the second structure is selected from among plural second structures, which are formed to be attachable to and removable from the first structure, and which comprise a fixing portion fixing the fixed shaft of the water turbine, and each of which forms different water passageway shape; and further by the fixing step, the fixed shaft of the water turbine is fixed to the fixing portion of the second structure selected in the selecting step.

Thus, even if a second structure is selected and attached in a space within a first structure, positional changes of the second structure relative to the water turbine can be suppressed and positional changes between the second structure forming the water passageway and the water turbine can be suppressed. Therefore, it can be suppressed that a flow rate of water flow acting on the water turbine changes from a predetermined flow rate, and it can be suppressed that an amount of electricity generated is changed from the predetermined amount of the electricity generated.

BRIEF DESCRIPTION OF THE DRAWINGS

FIG. 6 is a diagram showing each step in a method for manufacturing a hydraulic generator according to an embodiment of the disclosure.

DETAILED DESCRIPTION

FIGS. 1 through 5 illustrate a spouting apparatus comprising a hydraulic generator according to an embodiment of the disclosure.

Figure 1:
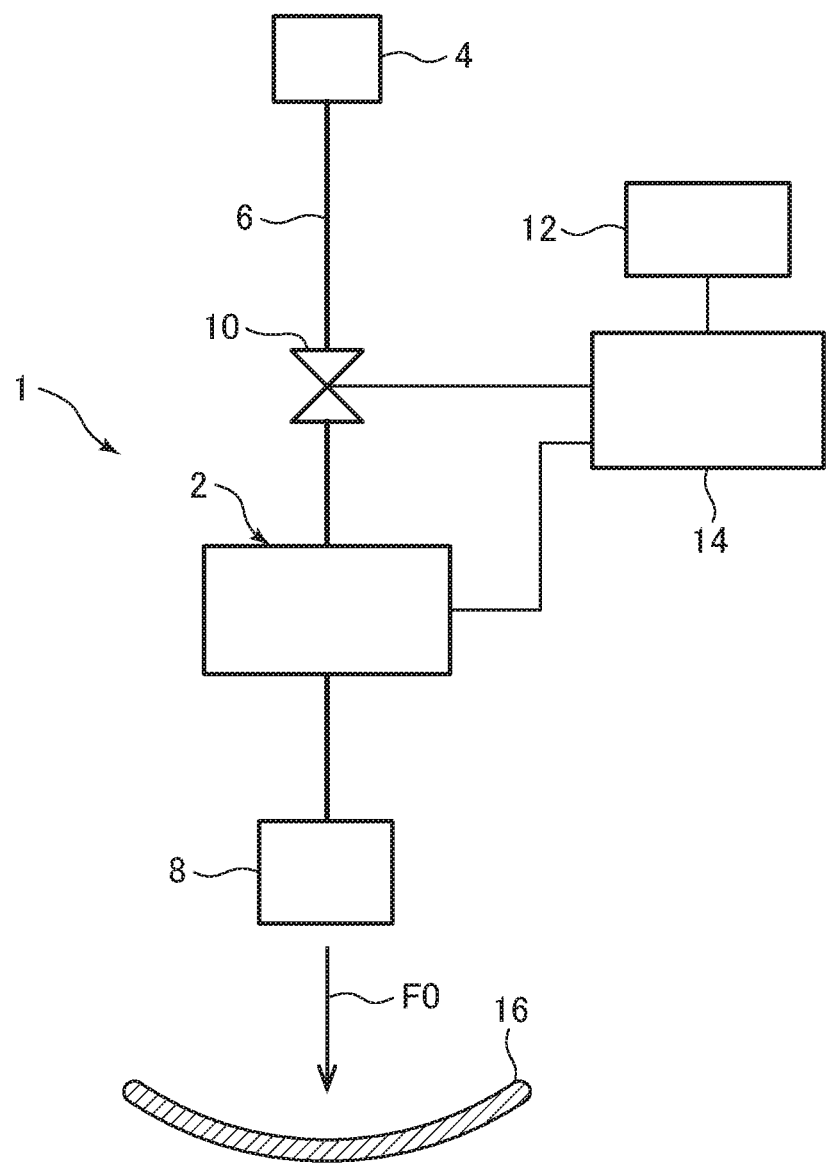
FIG. 1 is a summary schematic view of a spouting apparatus comprising a hydraulic generator according to an embodiment of the disclosure.
Figure 2:
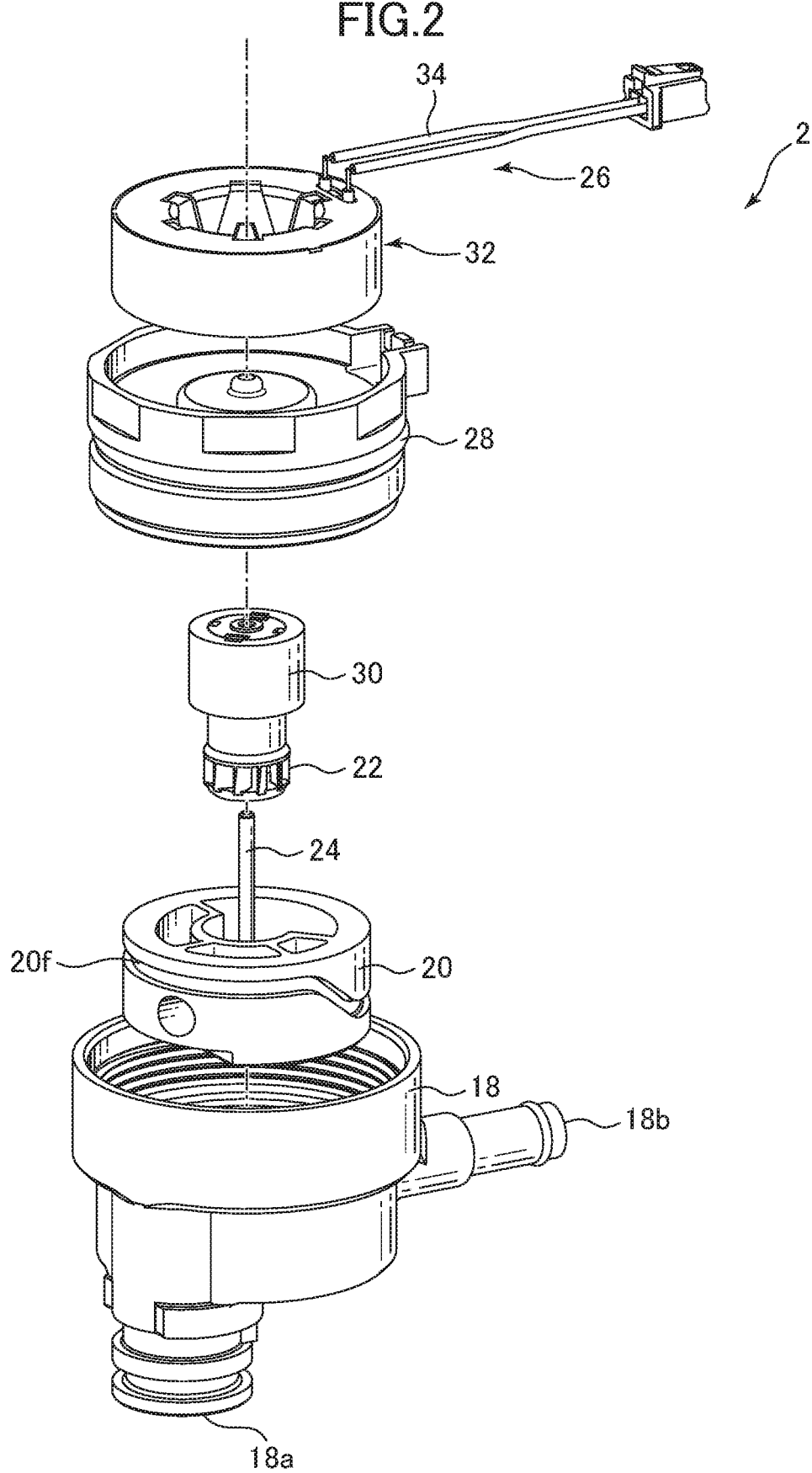
FIG. 2 is an expanded perspective view of a hydraulic generator according to an embodiment of the disclosure.
Figure 3:
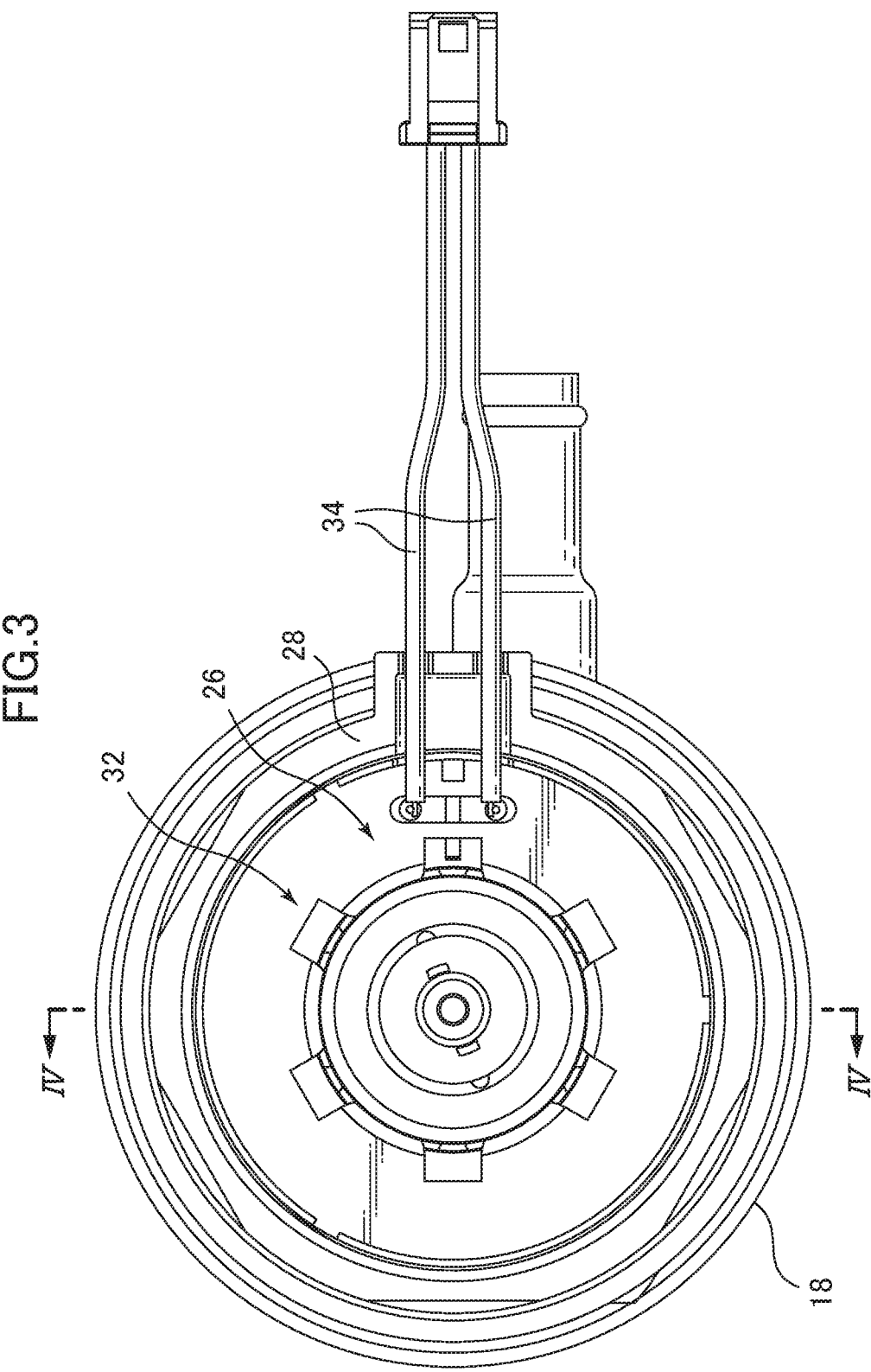
FIG. 3 is a plan view of a hydraulic generator according to an embodiment of the disclosure.
Figure 4:
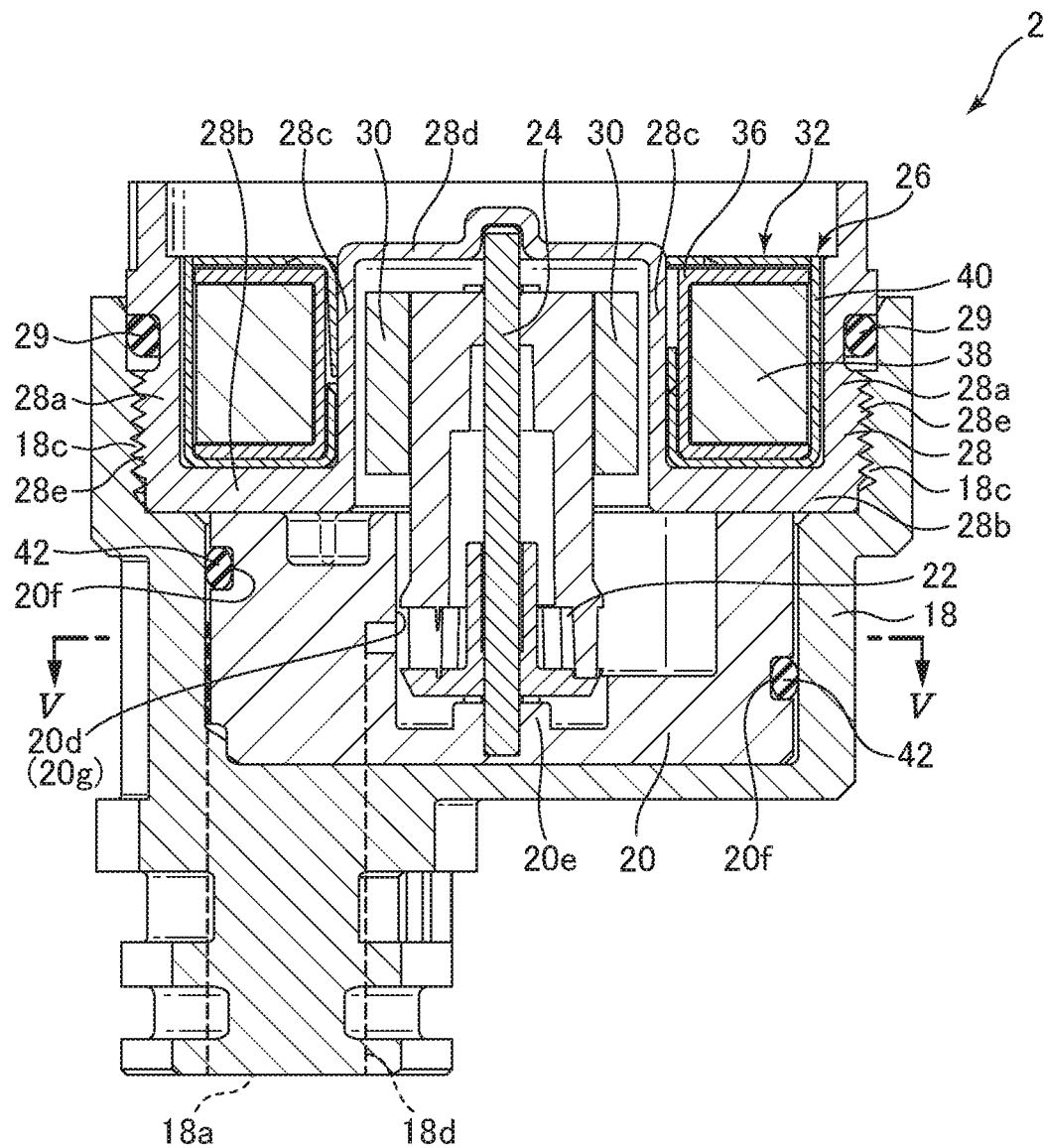
FIG. 4 is a cross section view viewed along line IV-IV in FIG. 3.
Figure 5:
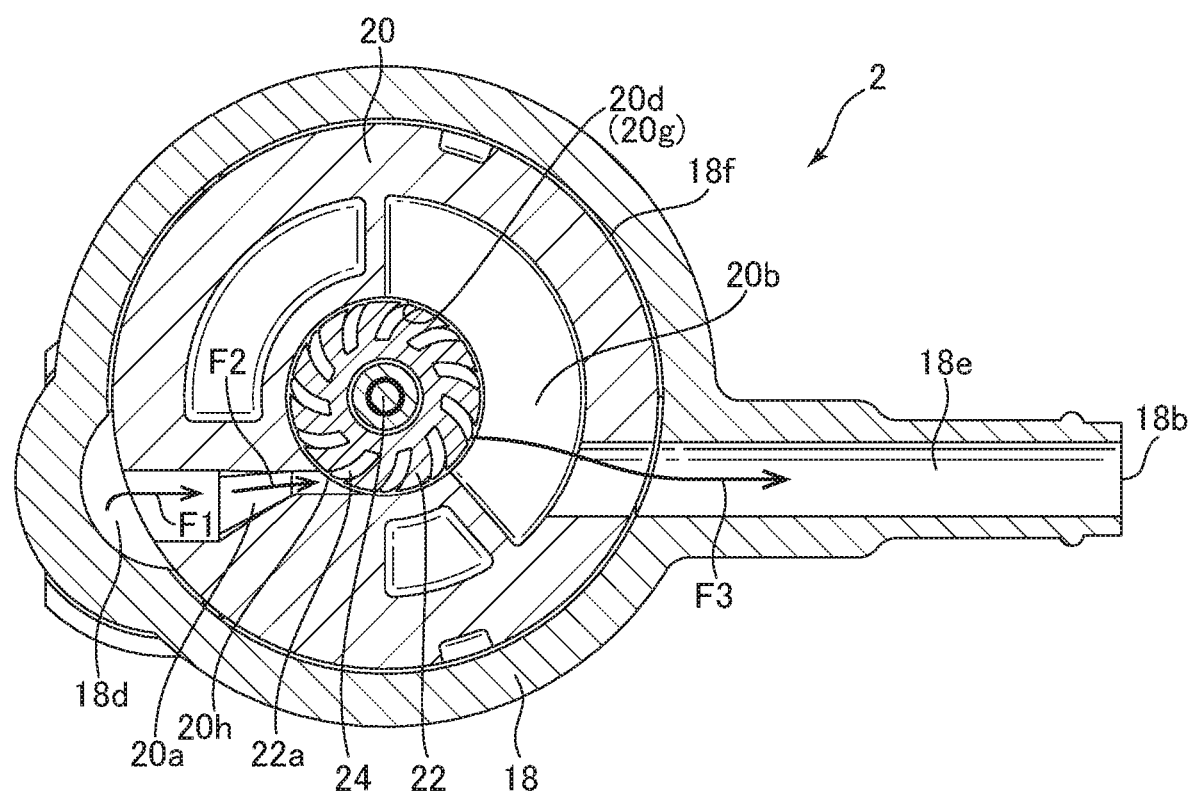
FIG. 5 is a cross section view viewed along line V-V in FIG. 4.

FIG. 1 is a summary schematic view of a spouting apparatus comprising a hydraulic generator according to an embodiment of the disclosure; FIG. 2 is an expanded perspective view of a hydraulic generator according to an embodiment of the disclosure; FIG. 3 is a plan view of a hydraulic generator according to an embodiment of the disclosure; FIG. 4 is a cross section view viewed along line IV-IV in FIG. 3; FIG. 5 is a cross section view viewed along line V-V in FIG. 4.

As shown in FIG. 1, spouting apparatus 1 comprising a hydraulic generator 2 according to an embodiment of the disclosure is a spouting apparatus for spouting water.

Spouting apparatus 1 comprises a supply flow path 6 for supplying water from a supply source 4 such as water supply etc.; a spouting portion 8 for spouting water supplied from the supply flow path 6; a valve 10 for opening and closing the supply flow path 6; a detection sensor 12 for detecting a presence of a user; a control portion 14 for controlling the valve 10 based on a detection signal from the detection sensor 12; and a hydraulic generator 2 installed on the supply flow path 6.

The spouting portion 8 spouts water toward a water receiving portion 16, as shown by arrow F0. The spouting portion 8 can be installed on a counter, a wall, a toilet apparatus, a toilet hand washing device, or the like. The water receiving portion 16 is formed so as to receive water. The water receiving portion 16 may be formed, for example, as a hand washing device, a sink, a counter bowl portion, a toilet body bowl portion, or the like.

By opening and closing the supply flow path 6, the valve 10 switches between a water passing state in which water is permitted to pass to the supply flow path 6 (a spouting state in which water is spouted from spouting portion 8), and a water shut off state, in which the flow of water to the supply flow path 6 is stopped (a shut off state in which water is not permitted to spout from the spouting portion 8). The valve 10 is electrically connected to the control portion 14.

The detection sensor 12 is an infrared human body detection sensor. The detection sensor 12 may also be an other sensor for detecting the presence of the user, such as a doppler sensor using microwaves. The detection sensor 12 is electrically connected to the control portion 14.

The control portion 14 is electrically connected to the valve 10, detection sensor 12, hydraulic generator 2, and the like, and is capable of transmitting and receiving electrical signals therewith so as to electrically control each of the above-described parts. The control portion 14 comprises a storage device (not shown) such as a memory, and a computing device (not shown), thereby enabling it to control the valve 10 and the detection sensor 12, and the like in the spouting apparatus 1. The control portion 14 has the function of supplying electrical power to any electrically connected device. The control portion may also comprise an electric storage unit (e.g. an electric accumulator, a capacitor), supply electrical power from the electric storage unit to any electrically connected device.

The hydraulic generator 2 is acted upon by the flow of water flowing through supply flow path 6 so as to generate electricity using water power. The hydraulic generator 2 generates at least a portion of the electrical power consumed by the valve 10, detection sensor 12, and control portion 14. The hydraulic generator 2 is electrically connected the control portion 14 and electrically connected through the control portion 14 to the valve 10, detection sensor 12, and other devices using electrical power, and is capable of supplying electrical power to the control portion 14, valve 10, detection sensor 12, and other devices using electrical power. The hydraulic generator may also supply electrical power through the electric storage unit to the control portion 14, valve 10, detection sensor 12, and other devices using electrical power.

Next, referring to FIGS. 2 through 5, we explain details of the hydraulic generator 2.

The hydraulic generator 2 comprises a first structure 18 forming a space permitting fluid communication between an inflow port 18a and an outflow port 18b; a second structure 20 by which, with the second structure 20 attached to the first structure 18, a water passageway is formed by the first structure 18 and the second structure 20 from the inflow port 18a to the outflow port 18b; a water turbine 22 which is rotated by water power by water flow passing through the water passageway; a fixed shaft 24 supporting the water turbine 22; an electrical generator 26 configured to convert the rotary motion of the water turbine 22 to electrical power; and a can case 28 for forming a watertight partition between the water turbine 22 and the electrical generator 26.

The water turbine 22 forms a rotor rotated by water power by water flow passing through the water passageway. The center part of the water turbine 22 is formed to be hollow, and the water turbine 22 is disposed with a fixed shaft 24 inserted into the hollow part thereof. The water turbine 22 of the present embodiment forms a fixed-shaft type of rotor. The water turbine 22 disposes plural blade portions 22a, wing-shaped in cross section, at equal intervals such that outer ends of the blade portions 22a are positioned along an outer perimeter of the water turbine 22. These blade portions 22a are formed to bend toward the direction of rotation in section as shown in FIG. 5, and the inside ends of the blade portions 22a are slightly advanced in the direction of rotation relative to the outside ends of the blade portions 22a. Therefore the blade portions 22a are disposed at a diagonal relative to the radial direction.

One end of the fixed shaft 24 is fixed to a second structure 20 as described below. The fixed shaft 24, in a fixed state, forms the center axis portion of a rotation of the water turbine 22. The other end of the fixed shaft 24 is disposed within an indentation formed in the top surface portion 28d of the can case 28 as described below, and while its movement in the radial direction is regulated, it is not fixed to the top surface portion 28d. The fixed shaft 24 is formed in a cylindrical rod shape. The fixed shaft 24 is formed of metal. The fixed shaft 24 may also be formed of resin. If the fixed shaft is formed of resin, the fixed shaft 24 may be formed integrally with the second structure.

The electrical generator 26 comprises, magnet 30, a stator 32, disposed in opposition to the outer circumferential surface of the magnet 30, and a harness 34 connected to the stator 32. The harness 34 is electrically connected to the stator 32 and the control portion 14. The harness 34 may be directly electrically connected to the valve 10, detection sensor 12, and other devices using electrical power, without mediation by the control portion 14.

The magnet 30 is connected to the water turbine 22 and rotates integrally with the water turbine 22. The magnet 30 is formed in a cylindrical shape on the outside of the fixed shaft 24. The outer peripheral surface of the magnet 30 is magnetized so that N poles and S poles alternately appear along the circumferential direction. The magnet 30, by rotating within a coils discussed below, generates electromotive force at the electrical generator 26. The magnet 30 is formed of ceramic material. The magnet 30 is disposed on the water passageway side partitioned by the can case 28. Thus the magnet 30 is disposed in water in the upper portion of a holding chamber 20d as discussed below, and rotates in water. The magnet 30 is placed in a state that the magnet 30 is separated from the inner perimeter surface portion 28c of the can case 28.

The stator 32 comprises a cylindrical bobbin 36, a coil 38 formed to wind a conductor wire around the bobbin 36, and a yoke 40 placed on the outside of the coil 38. The coil 38 produces electromotive force by the rotation of the magnet 30. The yoke 40 is formed by a magnetic body.

The can case 28 has a circular external shape. The can case 28 comprises an outer perimeter surface portion 28a formed in a cylindrical shape, a bottom surface portion 28b formed in a ring shape, an inner perimeter surface portion 28c formed in a cylindrical shape, and a top surface portion 28d covering further inner side area than the upper end of the inner perimeter surface portion 28c and formed in a disk shape. The can case 28, by means of the outer perimeter surface portion 28a, the bottom surface portion 28b, the inner perimeter surface portion 28c, and the top surface portion 28d of the can case 28, makes a watertight separation between the outside (atmosphere-side) space and inside (water passageway-side) space of the top surface portion 28d. A seal portion 29 is attached to the outer perimeter surface portion 28a of the can case 28; the seal portion 29 forms a watertight seal between the can case 28 and the first structure 18. A threaded portion 28e is formed on the outer perimeter surface portion 28a of the can case 28; this threaded portion 28e engages the threaded portion 18c on the inner perimeter portion of the first structure 18, thereby fix the can case 28 is fixed to the first structure 18. In addition, the can case 28 can be indirectly fixed so that the second structure 20 is housed within the first structure 18, and can be easily attached.

As shown in FIG. 5, the first structure 18 forms an outer shell of the water passageway extending from the inflow port 18a to the outflow port 18b. The first structure 18 comprises an inlet water passageway part 18d extending in the vertical direction upward from the inflow port 18a, an outlet water passageway part 18e extending in the horizontal direction to the outflow port 18b, and a cylindrical structure portion 18f forming a columnar space between the inlet water passageway part 18d and the outlet water passageway part 18e. The inlet water passageway part 18d may also be formed to extend in the horizontal direction from the inflow port 18a. Also, the outlet water passageway part 18e may be formed to extend in the vertical direction to the outflow port 18b.

A second structure 20 is attached in the columnar space within the cylindrical structure portion 18f of the first structure 18. The inner perimeter surface of the cylindrical structure portion 18f is formed to approximately match the outer circumferential surface of the second structure 20. Hence the inside diameter of the cylindrical structure portion 18f of the first structure 18 is formed to be essentially the same and slightly larger than the outside diameter of the second structure 20. The first structure 18 is formed of resin.

The second structure 20 forms an outer circumferential surface formed in a cylindrical shape. Hence the second structure 20 is attached to fit into the columnar space within the cylindrical structure portion 18f of the first structure 18. The second structure 20 can be relatively easily attached by screwing the can case 28 to the first structure 18 in a state that the second structure 20 is disposed within the first structure 18. The second structure 20 can be relatively easily removed by removing the can case 28 from the first structure 18. Thus the second structure 20 is formed to be attachable to and removable from the first structure 18.

The second structure 20 forms the water passageway for passing water. The second structure 20 is formed so that the water passageway is formed from the inflow port 18a to the outflow port 18b by the first structure 18 and the second structure 20 in a state that the second structure 20 is attached to the first structure 18. On the inflow port 18a side relative to the water turbine 22 in the water passageway, the second structure 20 forms an incoming conduit 20a for introducing water to the water turbine 22. The incoming conduit 20a is formed in a nozzle shape within the second structure 20. An introducing port 20h formed at the downstream end of the incoming conduit 20a forms a jet portion for spouting water so as to introduce water to the water turbine 22. The incoming conduit 20a may also be formed as a flow path, all or part of which is surrounded by the second structure 20 and the can case 28. The incoming conduit 20a is formed up to just before the blade portions 22a of the water turbine 22, with the opening diameter squeezed. The incoming conduit 20a constricts the flow path so that, relative to the flow rate supplied from the inlet water passageway part 18d of the first structure 18, a predetermined flow rate is fed to the water turbine 22. As described below, the fixed shaft 24 of the water turbine 22 is fixed to a fixing portion 20e on the second structure 20, making it difficult for the relative positional relationship between water turbine 22 and incoming conduit 20a to change. Hence changes in the distance between the introducing port 20h formed at the downstream end of the incoming conduit 20a and the blade portions 22a (the rotating blade portions 22a) are suppressed, and changes in the water flow acting on the blade portions 22a from the incoming conduit 20a caused by such changes in distance are suppressed. Therefore it can be suppressed that the flow rate of the water flow acting on the blade portions 22a of the water turbine 22 changes from a predetermined flow rate.

Also, the second structure 20 forms an outgoing conduit 20b for directing away water from the water turbine 22 on the outflow port 18b relative to water turbine 22 in the water passageway. The outgoing conduit 20b is formed as a flow path surrounded by the second structure 20 and the can case 28. A part or all of the outgoing conduit 20b may be formed inside the second structure 20.

The second structure 20 forms a holding chamber 20d formed in a columnar shape in which the water turbine 22 is disposed between the incoming conduit 20a and the outgoing conduit 20b. The holding chamber 20d is formed to surround the entire perimeter of the water turbine 22, and is formed to be slightly larger than the external shape of the water turbine 22. The holding chamber 20d forms a columnar interior space. The second structure 20 forms a wall surface 20g of the holding chamber 20d surrounding the entire perimeter of the water turbine 22. The second structure 20 is formed of resin.

The second structure 20 further comprises a fixing portion 20e for fixing the fixed shaft 24 of the water turbine. The fixing portion 20e is formed on the bottom surface at the center portion of the holding chamber 20d. The fixed shaft 24 is pressed in and fixed to the fixing portion 20e of the second structure 20. The second structure 20 forms a channel portion 20f around own entire perimeter of the second structure 20.

The second structure 20 forms a simple and columnar exterior shape. The second structure 20 is constituted as a replaceable unit. The second structure 20 is formed to be selectable from among plural second structures 20, each of which forms essentially the same round shape, and each of which forms respectively different water passageway shapes. The second structure 20 is also formed to be interchangeable with other second structures 20 forming different water passageway shapes. Second structures 20 forming different water passageway shapes are thus prepared, and intended a second structure 20 is selected from among second structures 20 forming different water passageway shapes, and applied. By thus selecting a second structure 20, it becomes possible to attach the second structure 20 with a water passageway shape suited to the supplied flow rate, and to make the flow rate of water flow acting on the water turbine 22 the optimal predetermined flow rate (intended flow rate) for the water turbine 22 when the flow rate of water supplied from the supply flow path 6 changes due to the installed site environment. The action of a predetermined flow rate of water flow on the water turbine 22 in this manner enables the electrical generator 26 to generate the predetermined amount of electricity. By selecting or replacing the second structure 20 to respond to sites with different supply flow rates, a particular water turbine 22 and electrical generator 26 can be used without changing (replacing) or adjusting the water turbine 22 and the electrical generator 26 of the hydraulic generator 2. Thus the need to manufacture plural types of water turbine and electrical generator 26 according to supplied flow rate can be suppressed. Also, in cases where the water turbine 22 and electrical generator 26 are required to change or adjust, the increase in the types of water turbine 22 and electrical generator 26 to be changed can be suppressed. It is also possible to control water pressure in the flow path on the downstream side by the second structure 20, by selecting a second structure 20 with a different water passageway shape.

For example, the shapes of the water passageway in the selectable second structure 20 may be formed into the shape having different cross sectional areas of the water passageway. Or, for example, a shape of a water passageway of a selectable second structure 20 can be formed into a shape of a water passageway further comprising a bypass water passageway for causing a part of water inflowing into further upstream side than the water turbine 22 to flow to further downstream side than the water turbine 22, without passing through the water turbine 22.

The hydraulic generator 2 further comprises a second structure seal portion 42 which is placed between the first structure 18 and the second structure 20 and which is a vibration absorbing member absorbing vibration between the first structure 18 and the second structure 20. The second structure seal portion 42 is a rubber member formed in a ring shape. The second structure seal portion 42 contacts the inner perimeter surface of the first structure 18 in a state that the second structure seal portion 42 is attached to the channel portion 20f of the second structure 20. Hence the second structure seal portion 42 constitutes a contacting portion between the second structure 20 and the first structure 18. The second structure seal portion 42 has the function of absorbing vibration. The second structure 20 comprises a fixing portion 20e, therefore although vibration from the fixed shaft 24 is transferred up to the second structure 20, by the second structure seal portion 42 the transmission of the vibration to the first structure 18 can be suppressed or can be weakened.

Next, as shown in FIG. 5, the water flow in the hydraulic generator 2 according to an embodiment of the disclosure is explained simply.

As indicated by arrow F1, in the water passageway formed by the first structure 18, the second structure 20, and the can case 28, water flows from the inflow port 18a into the inlet water passageway part 18d. Next, as indicated by arrow F2, water from incoming conduit 20a acts on the blade portions 22a of the water turbine 22. As indicated by arrow F3, water flowing into the water turbine 22 causes the water turbine 22 to rotate, then flows out from the water turbine 22. Outflowing water flows from the outgoing conduit 20b through the outlet water passageway part 18e to the outflow port 18b.

Next, as shown in FIG. 6, a method of manufacturing a hydraulic generator according to an embodiment of the disclosure is explained.

FIG. 6 is a diagram showing each step in a method for manufacturing a hydraulic generator according to an embodiment of the disclosure. Here, in FIG. 6, each step is indicated by an S. Below, to explain a summary of the method of manufacturing the hydraulic generator in an easily understandable manner, explanations of the attachment etc. of the second structure seal portion 42 are omitted.

First, as shown step S1 in FIG. 6, the manufacturer of the hydraulic generator prepares a first structure 18 to form a space permitting fluid communication between the inflow port 18a and outflow port 18b.

As shown in step S2, a water turbine 22 rotated by water power by water flow flowing in a water passageway and rotating is prepared.

As shown in FIG. S3, an electrical generator 26 for converting the motion of the water turbine 22 into electricity power is prepared.

As shown in step S4, plural second structures 20, which are formed to be attachment and removal from the first structure 18, and which comprise a fixing portion 20e fixing a fixed shaft 24 of the water turbine 22, and each of which forms different water passageway shape, are prepared. If plural second structures 20 have already been prepared at the time of manufacturing, this step S4 is omitted during manufacturing, and step S5 is executed.

As shown in step S5, a second structure 20 is selected from among plural second structures 20.

As shown in step S6, the fixed shaft 24 of the water turbine 22 is fixed to the fixing portion 20e on the second structure 20 selected in S5.

As shown in step S7, the second structure 20 to which a fixed shaft was fixed in S6 is disposed in the first structure 18.

As shown in step S8, the water turbine 22 is disposed in the second structure 20 to which a fixed shaft was fixed in S6.

As shown in step S9, with the second structure 20 and the water turbine 22 having been disposed in the first structure 18 by S7 and S8, the can case 28 is attached to the first structure 18, and the electrical generator 26 is also attached to the first structure 18. A hydraulic generator 2 is thus manufactured. A spouting apparatus 1 is manufactured by attaching the hydraulic generator 2 manufactured to other prepared equipment.

According to a hydraulic generator 2 of an embodiment of the disclosure, the second structure 20 which is formed to be attachable to and removable from the first structure 18, and which comprises a fixing portion fixing a fixed shaft of the water turbine 22. Thereby even if the second structure 20 is removably attached in a space within the first structure 18, positional changes of the second structure 20 relative to the water turbine 22 can be suppressed, and positional changes between the second structure 20 forming the water passageway and the water turbine 22 can be suppressed. Therefore, it can be suppressed that a flow rate of water flow acting on the water turbine 22 changes from a predetermined flow rate, and it can be suppressed that an amount of electricity generated is changed from the predetermined amount of the electricity generated.

Also, according to the hydraulic generator 2 of an embodiment of the disclosure, positional changes between the second structure 20 forming incoming conduit 20a and introducing port 20h, and the water turbine 22, can be suppressed. Thereby, it can be suppressed that the flow rate of the water flow introduced to the water turbine from the incoming conduit 20a changes from deviating from a predetermined flow rate, and it can be more reliably suppressed that the amount of electricity generated is changed from the predetermined amount of electricity generated.

If the second structure 20 is not formed to surround the entire perimeter of the water turbine 22, wall surfaces of the second structure 20 and first structure 18 etc. would be placed around the water turbine 22, and gaps would be formed between a wall surface of the second structure 20 and a wall surface of the first structure 18 around the water turbine 22. There is a risk that such gaps would cause turbulent flows and change the flow rate of the water flow acting on the water turbine 22 from the predetermined flow rate.

According to a hydraulic generator 2 of an embodiment of the disclosure, the second structure 20 forms a wall surface 20g of the holding chamber 20d surrounding the entire perimeter of the water turbine 22. Thereby, forming a gap between the wall surface of the second structure 20 and the wall surface of the first structure 18 around the water turbine 22 can be suppressed. Therefore it can be further suppressed that the flow rate of the water flow acting on the water turbine 22 changes from a predetermined flow rate by causing turbulent flows by such gaps.

Also, according to a hydraulic generator 2 of an embodiment of the disclosure, the second structure 20 fixes the fixed shaft 24 of the water turbine 22 by a fixing portion 20e. Thereby, vibration of the fixed shaft 24 caused by rotation of the water turbine 22 is transferred to the second structure 20. At this case, a second structure seal portion 42 is provided between the first structure 18 and the second structure 20. Therefore vibration transferred to the second structure 20 is absorbed by the second structure seal portion 42, and the risk that vibration from the fixed shaft 24 would be transferred through the second structure 20 to the first structure 18, and transferred to the whole hydraulic generator, piping, etc., can be suppressed by the second structure seal portion 42.

According to a spouting apparatus 1 comprising a hydraulic generator 2 of an embodiment of the disclosure, when the flow rate of water flow supplied to a hydraulic generator 2 changes in response to the installation environment, in order to suppress changes of the amount of the electricity generated, the second structure 20 is selected or replaced so as to supply a predetermined flow rate to the hydraulic generator. Even if the second structure 20 is selected or replaced, positional changes in the second structure 20 relative to the water turbine 22 can be suppressed, and positional changes between the second structure 20 forming the water passageway and the water turbine 22 can be suppressed. Thereby, it can be suppressed that the flow rate of the water flow acting on the water turbine 22 changes from the predetermined flow rate, and it can be suppressed that the amount of electricity generated is changed from the predetermined amount of electricity generated. Thus it can be suppressed that the amount of electricity generated is changed from the predetermined amount of electricity generated even when a second structure 20 in a spouting apparatus 1 is formed to be attachable to and removable from the first structure 18.

According to the method for manufacturing a hydraulic generator 2 of an embodiment of the disclosure, by the selecting step, the second structure 20 is selected from among plural second structures, which are formed to be attachable to and removable from the first structure 18, and which comprise a fixing portion 20e fixing the fixed shaft 24 of the water turbine 22, and each of which forms different water passageway shape; and further by the fixing step, the fixed shaft 24 of the water turbine 22 is fixed to the fixing portion 20e of the second structure 20 selected in the selecting step. Thus, even if a second structure 20 is selected and attached in a space within a first structure 18, positional changes of the second structure 20 relative to the water turbine 22 can be suppressed and positional changes between the second structure 20 forming the water passageway and the water turbine 22 can be suppressed. Therefore, it can be suppressed that a flow rate of water flow acting on the water turbine 22 changes from a predetermined flow rate, and it can be suppressed that an amount of electricity generated is changed from the predetermined amount of the electricity generated.

What is claimed is:

1. A hydraulic generator for generating electricity by water power, comprising:
    a first structure configured to form a space communicating between an inflow port and an outflow port;
    a second structure attached in the space within the first structure, wherein a water passageway from the inflow port to the outflow port is formed by the first structure and the second structure in a state that the second structure is attached to the first structure;
    a water turbine configured to rotate around a fixed shaft by water flow flowing in the water passageway; and
    an electrical generator configured to convert a water power to electrical power;
    wherein the second structure is removable from the first structure, and comprises a fixing portion fixing the fixed shaft of the water turbine, and the second structure comprising a fixing portion fixing the fixed shaft of the water turbine forms an introducing port for introducing water to the water turbine.

2. The hydraulic generator of claim 1, wherein the introducing port of the second structure is formed so as to introduce water to the water turbine from a lateral direction of the water turbine, the second structure further comprises an outgoing path for directing away water from the water turbine toward an outlet water passageway part of the first structure formed in the lateral direction of the water turbine.

3. The hydraulic generator of claim 1, wherein the second structure forms a wall surface of a holding chamber surrounding an entire perimeter of the water turbine.

4. The hydraulic generator of claim 1, further comprising:
a vibration absorbing member which is mounted between the first structure and the second structure, and which is configured to absorb vibration between the first structure and the second structure.

5. A spouting apparatus for spouting water, comprising:
a valve configured to open and close a supply flow path for supplying water;
a detection sensor configured to detect a presence of a user;
a control portion configured to control the valve based on a detection signal from the detection sensor;
and the hydraulic generator of claim 1 configured to generate at least a portion of electrical power consumed by the valve, the detection sensor, and the control portion.

6. A method for manufacturing a hydraulic generator comprising:
a first structure configured to form a space communicating between an inflow port and an outflow port; a second structure attached in the space within the first structure, wherein a water passageway from the inflow port to the outflow port is formed by the first structure and the second structure in a state that the second structure is attached to the first structure; a water turbine configured to rotate around a fixed shaft by water flow flowing in the water passageway; and an electrical generator configured to convert water power to electrical power;
the method including:
selecting the second structure from among plural second structures, which are formed to be removable from the first structure and which comprise a fixing portion fixing a fixed shaft of the water turbine, and each of which forms different water passageway shape, and the second structure comprising a fixing portion fixing the fixed shaft of the water turbine forms an introducing port for introducing water to the water turbine; and
fixing the fixed shaft of the water turbine to the fixing portion of the second structure selected in the selecting.

\* \* \* \* \*